United States Patent Office 3,542,851
Patented Nov. 24, 1970

3,542,851
NOVEL ACRYLATE, AMINES AND ETHERS
Arthur A. Patchett, Cranford, Robert L. Clark, Woodbridge, and Edward F. Rogers, Middletown, N.J., assignors to Merck & Co., Inc., Rahway, N.J., a corporation of New Jersey
No Drawing. Original application July 1, 1966, Ser. No. 562,134, now Patent No. 3,399,203, dated Aug. 27, 1968. Divided and this application May 25, 1967, Ser. No. 651,081
Int. Cl. C07c 87/48, 101/44
U.S. Cl. 260—471  3 Claims

ABSTRACT OF THE DISCLOSURE

The following novel compounds are prepared: 3-loweralkyl-4-loweralkoxy-nitrobenzene, 3 - loweralkyl-4-loweralkoxy-aniline, and loweralkyl-α-carboalkoxy-β-(3-loweralkyl-4 - loweralkoxy-anilino)acrylate. These compounds are used to prepare lower alkyl-6,7-disubstituted-4-hydroxy-quinoline-3-carboxylates having a high degree of anticoccidial activity.

---

This application is a divisional application of U.S. Ser. No. 562,134 filed July 1, 1966, now U.S. Pat. 3,399,203 issued Aug. 27, 1968.

This invention relates to new chemical compounds. More specifically, it relates to novel 6,7-disubstituted-quinoline-3-carboxylates. Still more specifically, it is directed to lower alkyl-6,7-disubstituted-4-hydroxy-quinoline-3-carboxylates having a high degree of anticoccidial activity. It relates further to the use of these carboxylates as coccidiostats and to novel anticoccidial composiitons containing them as active ingredients. It relates likewise to the chemical synthesis of these loweralkyl-6,7-disubstituted-4-hydroxyquinoline-3-carboxylates, and to novel intermediates in such synthesis.

Coccidiosis is a widespread poultry disease involving the invasion of caecal and intestinal mucosa by coccidia, specifically protozoan parasites of the genus Eimeria. The most important of these species are E. maxima, E. ascervulina, E. tenella, E. necatrix, E. brunetti, E. praecox and E. mitis. When left untreated, the severe forms of the disease leads to poor weight gain, reduced feed efficiency, reduced egg production and high mortality. For these reasons, the control of coccidiosis is highly important to the poultry industry.

Certain loweralkyl-4-hydroxy-6,7 - dialkoxy-quinoline-carboxylates have been previously described as having anticoccidial activity, but efforts have continued to find even more satisfactory and potent compounds. According to the present invention, it has now been discovered that loweralkyl-4-hydroxy - 6 - loweralkoxy - 7 - loweralkyl-quinoline-3-carboxylates have a surprisingly and unexpectedly high degree of activity against coccidiosis, and that in certain of such compounds this antiparasitic activity is substantially greater than it is in the 6,7-dialkoxy quinoline carboxylates.

An object of this invention, therefore, is to provide new quinoline carboxylates which are useful in the control of coccidiosis. A further object is to provide novel compounds useful as intermediates in praparing these coccidiostats. Another object is to provide novel anticoccidial compositions containing the compounds described below as an active ingredient. A still further object is provision of methods of making such compounds and composiitons. An additional object is provision of methods of combatting coccidiosis by administering to poultry minor amounts of the anticoccidial substances described herein. Further objects will become evident from the following discussion of the invention.

In accordance with the present invention, it has now been found that the compounds represented by the structural Formula I possess significant and unexpectedly high anti coccidial activity,

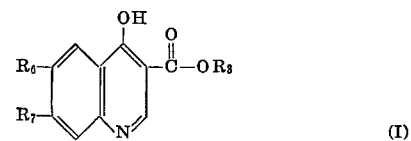

(I)

where $R_3$ is loweralkyl; $R_6$ is loweralkoxy; and $R_7$ is loweralkyl. $R_3$ in this formula represents loweralkyl radicals such as methyl, ethyl, propyl, isopropyl, butyl and pentyl; the preferred compounds are methyl or ethyl quinoline carboxylates where $R_3$ is methyl or ethyl. The symbol $R_6$ represents a loweralkoxy radical such as methoxy, ethoxy, n-propoxy, n-butoxy, isopropoxy, isobutoxy and the like, with those radicals having 3–4 carbon atoms being preferred. $R_7$ represents loweralkyl, examples of which are ethyl, n-propyl, isopropyl, n-butyl, isobutyl and pentyl; it is preferred that the loweralkyl radical at the 7-position contain 3–4 carbon atoms.

Of the novel compounds represented by Formula I above, those wherein $R_3$ is methyl or ethyl, and wherein the total number of carbon atoms in the substituents $R_6$ and $R_7$ taken together is 7 or 8 have an unusually high degree of activity against coccidiosis, particularly against infection due to E. tenella and/or E. brunetti. Such substances therefore represent the preferred embodiments of this invention.

The loweralkyl-4-hydroxy-6-loweralkoxy-7- loweralkyl-quinoline-3-carboxylates defined by Formula I above are prepared from an appropriately substituted 1-loweralkyl-2-loweralkoxy-5-nitrobenzene by the process depicted structurally as follows:

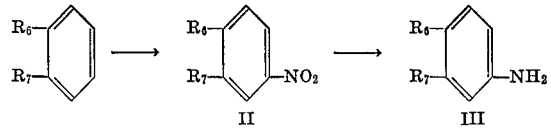

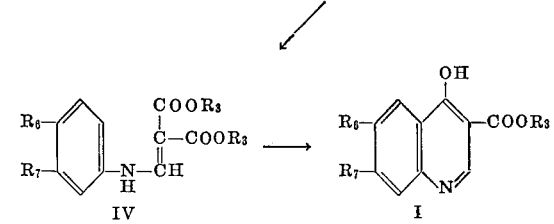

where $R_3$, $R_6$ and $R_7$ are as previously defined.

In the first step of this synthesis a 2-loweralkoxy-alkyl benzene is nitrated with concentrated or fuming nitric acid in order to obtain the 2-loweralkoxy-5-nitro-loweralkyl benzene of Formula II. (Throughout this discussion of chemical synthesis, $R_3$ and $R_7$ represent loweralkyl, and $R_6$ represents loweralkoxy.) The nitration is conveniently carried out at about room temperature or slightly above for from 1–3 hours, and Compound II then recovered by quenching the mixture in ice water and extracting into a water-immiscible solvent such as chloroform. The 2-loweralkoxy-loweralkyl benzenes used as starting materials in this reaction are conveniently obtained by alkylation of a 2-loweralkyl phenol with the appropriate loweralkyl bromide in the presence of a base such as an alkali metal alkoxide.

The 2-loweralkoxy-5-nitro-loweralkyl benzene of Formula II is next reduced to the corresponding amine of Formula III by catalytic hydrogenation in the presence of a suitable catalyst such as palladium, nickel or ruthenium. Lower alkanolic solvent media are preferred, although other solvent systems suitable for catalytic hydrogenations may also be used. The reduction is preferably carried out at superatmospheric pressure of about 10–50 p.s.i.g. When hydrogen consumption ceases the solid catalyst is removed. The amine of Formula III may be recovered from the filtrate, if desired, by techniques known to those skilled in this art, but it is preferred to by-pass the isolation and react the 2-loweralkoxy-5-amino-loweralkyl benzene (III) directly with a diloweralkyl loweralkoxy methylene malonate of the formula:

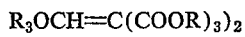

to produce the loweralkyl-α-carboalkoxy-β-(3-loweralkyl-4-loweralkoxy-anilino) acrylate of Formula IV above. Solvents such as loweralkanols, e.g. ethanol, propanol or isopropanol, others such as diethylether, dioxane, diethylene glycol, dimethylether, and the like are used for this reaction. The reactants are preferably present in a molar ratio of 1:1 but this may vary somewhat without substantial adverse effect on the quantity of acrylate obtained. This reaction may be carried out at 40°–120° C. but temperatures in the range of 50°–100° are normally used.

The acrylate is then converted to the desired quinoline-3-carboxylate (I) by heating at a temperature of from about 200–300° C. Although not essential to the success of this process, it is preferred that formation of the quinoline be brought about in a high boiling solvent such as dimethylsulfone, dodecylbenzene, diphenyl, diphenylether, and the like.

As previously stated, the compounds of Formula I above, and particularly those where $R_3$ is methyl or ethyl, and the number of carbon atoms in $R_6$ and $R_7$ together is 7 or 8, are highly effective for the treatment or prevention of poultry coccidiosis. For this purpose, they are administered to poultry as a component of the feed or drinking water. The optimum amount of active agent necessary for adequate control of the disease will, of course, vary with the severity of infection, the duration of treatment and the particular compound employed as the coccidiostat.

The loweralkyl-4-hydroxy-6-loweralkoxy-7-loweralkyl-quinoline-3-carboxylates of the invention are generally administered via the poultry feedstuff. Feed levels of from about 0.0002% to about 0.025% by weight of feed afford satisfactory results, with levels of about 0.0004% to about 0.02% by weight being preferred for best overall anticoccidial effect. The feed may be of any type employed in the poultry-raising industry, e.g. a mash containing ground grain, animal and vegetable proteins, mineral and vitamin concentrates, or a broiler feed containing a large proportion of ground yellow corn together with other nutritive substances such as fish meal, soybean oil meal, meat products, minerals and vitamins.

When the active agents are to be administered by way of the drinking water, somewhat lower levels than those in feed will be satisfactory since the birds drink about twice as much as they eat. The use of the coccidiostats in drinking water is made more practically useful by addition to the water of a suspending agent such as acacia, tragacanth, Veegum (colloidal magnesium-aluminum silicate, R. E. Vanderbilt Co.), carboxypolymethylene, algins, methylcellulose, hydroxyethylcellulose and others, which promotes even distribution of the water insoluble material.

The activity of certain of the preferred compounds of this invention against two important strains of coccidia is set forth below, the activity figures denoting the feed concentration at which infection due to strains of E. tanella and E. brunetti is controlled in poultry:

| Compound | Activity | |
|---|---|---|
| | E. tenella | E. brunetti |
| (a) Methyl-4-hydroxy-6-n-propoxy-7-isobutyl-quinoline-3-carboxylate | 0.0015 | 0.00038 |
| (b) Ethyl-4-hydroxy-6-isobutoxy-7-isobutyl-quinoline-3-carboxylate | 0.003 | 0.00038 |
| (c) Methyl-4-hydroxy-6-isobutoxy-7-isobutyl-quinoline-3-carboxylate | 0.0015 | 0.0038 |

In addition to providing the novel compounds described herein, it is a further embodiment of the invention to provide novel compositions in which said compounds defined by Formula I are present as an active anticoccidial ingredient. Such compositions comprise the quinoline-3-carboxylates intimately dispersed in or admixed with an inert carrier or diluent. By an inert carrier is meant one that is essentially nonreactive with the active anticoccidial ingredient and that may be administered with safety to the animals. In the case of solid compositions, the carrier or diluent is preferably one that is orally ingestible and that is or may be an ingredient of the animal feed. Preferred drinking water formulations are water-soluble powders, aqueous suspensions, or solutions.

The compositions which are one of the preferred features of the invention are feed supplements in which the active anticoccidial ingredient is present in a relatively large amount in a poultry feed additive. Diluents which are normally employed for these animal feed supplements are solid orally ingestible poultry feed additives such as distillers' dried grains, corn meal, citrus meal, crushed limestone, and the like. The diluents preferred have nutritive value to the poultry and are normal ingredients of the finished feed. These supplements are incorporated in the poultry feed either directly or in an intermediate dilution or blending step. These premixes or feed supplements may contain about 2.5–40% by weight of the active ingredient. The finished feeds previously discussed are also included within the compositions of the invention.

Examples of typical feed supplements containing a quinoline-3-carboxylate of this invention are the following:

(A):                                             Lbs.
    Methyl-4-hydroxy - 6 - isobutoxy-7-isobutyl-quinoline-3-carboxylate _____ 15
    Corn meal _____ 85

(B):
    1 - (2 - n - propyl-4-amino-5-pyrimidylmethyl)-2-methyl pyridinium chloride hydrochloride ___ 10
    Methyl - 4 - hydroxy - 6 - n - propoxy-7-isobutyl-quinoline-3-carboxylate _____ 25
    Distillers' dried grains _____ 65

As indicated by Feed Supplement B, the loweralkyl-4-hydroxy - 6 - loweralkoxy - 7 - loweralkyl - quinoline-3-carboxylates described herein, in addition to being used alone for combatting coccidiosis, may also be employed in conjunction with other coccidiostats such as amprolium, ethopabate, nicarbazine, 2-methyl-3,5-dinitrobenzamide and the like. When such mixtures are used, the several coccidiostats are generally mixed together at the desired concentration in the feed supplement and in the finished poultry feedstuff.

The following examples are given for the purpose of illustration and not by way of limitation.

EXAMPLE 1

To 30 ml. of concentrated nitric acid there is added at 25–30° C. 17 g. (0.1 m.) of 2-isopropoxy-n-propylbenzene. The mixture is stirred for two hours at room temperature. At the end of this time an equal volume of ice and water are added and the resulting mixture extracted with 75 ml. of chloroform. The chloroform extracts are washed with water and aqueous sodium bicarbonate solution, then dried over magnesium sulfate. The chloroform solution is evaporated to dryness and the residue distilled in vacuo. 2-isopropoxy-5-nitro-n-propylbenzene distills at 130–140° C./2 mm.

When the above process is repeated using 0.1 mole of other 2-loweralkoxy loweralkyl benzenes in place of 2-isopropoxy-n-propylbenzene, the corresponding 5-nitro compound is obtained and recovered as described above. In this way there are obtained 2-isopropoxy-5-nitro-isopropylbenzene; 2-n-propoxy-5-nitro-n-propylbenzene; 2-isobutoxy-5-nitro-n-propylbenzene; 2-isobutoxy - 5 - nitro-isopropylbenzene, B.P. 125–136° C./1 mm.; 2-n-propoxy-5-nitro-isopropylbenzene, B.P. 105–123° C./1 mm.; 2-isopropoxy-5-nitro-isobutylbenzene; and 2-isopropoxy-5-nitro-n-propylbenzene, B.P. 130–140° C./2 mm.

EXAMPLE 2

(A) 182 g. (0.9 m.) of 2-isobutyl-isobutoxybenzene is heated with a solution of 400 ml. of concentrated nitric acid in 1600 ml. of glacial acetic acid on the steam bath for 30 minutes. The reaction mixture is then poured into ice water and extracted with 3× 300 ml. of n-hexane. The combined hexane extracts are washed with water, dilute sodium bicarbonate solution, water and dried over magnesium sulfate. Evaporation of the solvent yields a residue of 2-isobutyl-4-nitro-isobutoxybenzene (2-isobutoxy-5-nitro-isobutylbenzene) which distills at 125–130° C./1 mm.

(B) Using the procedure of Example 2A, 21.4 g. (0.11 m.) of 2-n-propoxy-isobutylbenzene are converted to 2-n-propoxy-5-nitro-isobutylbenzene which distills at 120–125° C./1 mm.

EXAMPLE 3

(A) A mixture of 13 g. of 2-isopropoxy-5-nitro-n-propylbenzene and 1 g. of 5% palladium on carbon in 150 ml. of methanol is hydrogenated (with hydrogen gas) at room temperature and a pressure of 40 p.s.i.g. When hydrogen consumption is essentially complete the reaction is stopped and the solid catalyst removed by filtration. The filtrate contains 2-isopropoxy-5-amino-n-propylbenzene (3-n-propyl-4-isopropoxyaniline). This amine is not isolated but instead reacted directly in the next step of the process.

(B) When Example 3A is repeated using 0.05 m. of 2-loweralkoxy-5-nitro-loweralkylbenzene produced as in Example 1, the following amines are obtained: 2-isopropoxy - 5 - amino-isopropylbenzene; 2-n-propoxy-5-amino-n-propylbenzene; 2-isobutoxy-5-amino - n - propylbenzene; 2-isobutoxy - 5 - amino - isopropylbenzene; 2-n-propoxy-5-amino-isobutylbenzene; 2 - isopropoxy-5-amino-isobutylbenzene; and 2 - isopropoxy - 5 - amino-n-propylbenzene. These substances are reacted directly with loweralkyl-loweralkoxy methylene malonate without further purification.

EXAMPLE 4

The methanolic filtrate obtained in Example 3A and containing 2-isopropoxy-5-amino-n-propylbenzene is divided into two equal portions. To one portion there is added 4.5 g. of diethyl methoxymethylene malonate. The resulting solution is heated on a steam bath for about two hours (until all the methanol has evaporated). The resulting oil consists predominantly of the anil methyl-α-carbomethoxy-β-(3-n-propyl-4-isopropoxy-anilino) acrylate, which is converted directly without further purification to the quinoline-3-carboxylate as follows. The oily acrylate is added to 100 ml. of stirred dodecyl benzene at 250° C. The mixture is stirred for 10 minutes at 250° C. then cooled slowly to about room temperature. The precipitated solid is removed by filtration, washed with ether and then triturated with a small volume of acetone to give substantially pure methyl-4-hydroxy-6-isopropoxy-7-n-propyl-quinoline-3-carboxylate, M.P. 246–248° C.

The other half of the methanolic filtrate containing 3-n-propyl-4-isopropoxy aniline is added to 5.4 g. of diethyl-ethoxymethylene malonate and the solution heated for two hours on a steam bath, permitting evaporation of the methanol. The resulting oil ethyl α-acarboethoxy-β-(3-n-propyl-4-isopropoxy-anilino) acrylate is added to 100 ml. of dodecyl benzene at 250° C. and the mixture stirred at this temperature for 10 minutes then cooled as above to precipitate ethyl-4-hydroxy-6-isopropoxy-7-n-propyl-quinoline-3-carboxylate. This is purified in the same manner as described above for the methyl ester to give substantially pure material, M.P. 213–215° C.

EXAMPLE 5

A solution of 135 g. (0.53 m.) of 2-isobutyl-4-nitro-isobutoxybenzene (2-isobutoxy-5-nitro - isobutylbenzene) in 1200 ml. of anhydrous methanol is hydrogenated at room temperature at 40 lbs./sq. in. pressure in the presence of 10 g. of 5% palladium on charcoal. When hydrogen uptake is essentially complete the catalyst is removed and the solvent evaporated to give a residue of 2-isobutoxy-5-amino-isobutyl benzene. 94 g. (0.54 m.) of dimethylmethoxymethylene malonate are added to this residue, and this reaction mixture is heated on a steam bath for two hours to produce the anil methyl-α-carbomethoxy-β-(3-isobutyl-4-isobutoxy-anilino) acrylate. This oily mixture is then added to 2000 ml. of stirred dodecyl benzene previously heated to 245° C. The mixture is kept at 245–250° C. for 30 minutes, then allowed to cool slowly to room temperature. The precipitated methyl-4-hydroxy-6-isobutoxy-7-isobutyl-quinoline-3-carboxylate is filtered and washed with n-hexane and acetone to give pure product, M.P. 264–267° C.

When the above process is repeated using 0.54 m. of diethyl-ethoxymethylene malonate, there is obtained ethyl-4-hydroxy-6 - isobutoxy - 7 - isobutyl - quinoline - 3-carboxylate, M.P. 249–252° C.

EXAMPLE 6

14.6 g. (0.06 m.) of 2-n-propoxy-5-nitro-isobutyl-benzene (2-isobutyl-4-nitro-n-propoxybenzene) is hydrogenated at room temperature in 100 ml. of methanol using 1 g. of 5% palladium on charcoal at a hydrogen pressure of 40 p.s.i.g. When hydrogen uptake is completed the catalyst is removed and the methanol removed by distillation to afford 2-n-propoxy-5-amino-isobutyl-benzene. To this product is added 10.5 g. (0.06 m.) of dimethylmethoxymethylene malonate. The mixture is heated on the steam bath for two hours to form methyl-α-carbomethoxy - β - (3-isobutyl-4-n-propoxy-anilino) acrylate. This product is then added to 200 ml. of stirred dodecyl benzene at 245° C. This mixture is stirred at 250–260° C. for 30 minutes, and then cooled to room temperature. The precipitated methyl-4-hydroxy-6-n-propoxy-7-isobutyl-quinoline-3-carboxylate is recovered by filtration, and washed successively with n-hexane and acetone to give substantially pure material, M.P. 267–269° C.

When 0.06 m. of diethyl ethoxymethylene malonate is used in the above procedure instead of dimethyl methoxymethylene malonate, there is obtained ethyl-4-hydroxy-6-n-propoxy-7-isobutyl-quinoline-3-carboxylate, M.P. 273–274° C.

EXAMPLE 7

When the compounds of Example 3B are reacted with dimethylmethoxymethylene malonate or with diethyl ethoxymethylene malonate according to the procedure of Example 6, the following quinoline-3-carboxylates are obtained, the dimethyl malonate giving the methyl ester, and diethyl malonate giving the ethyl ester: methyl 4-hydroxy-6-n-propoxy-7-n-propyl-quinoline-3 - carboxylate, M.P. 262–264° C.; ethyl 4-hydroxy-6-n-propoxy-7-n-propyl - quinoline - 3 - carboxylate, M.P. 250–253° C.; methyl 4 - hydroxy - 6-isobutoxy-7-isopropyl-quinoline-3-carboxylate, M.P. 230–235° C.; methyl 4-hydroxy-6-n-propoxy-7-isopropyl-quinoline-3-carboxylate, M.P. 270–272° C.; ethyl 4-hydroxy-6-n-propoxy-7-isopropyl-quinoline-3-carboxylate, M.P. 265–266° C.; methyl 4-hydroxy-6-isopropoxy-7-isobutyl - quinoline - 3 - carboxylate, M.P.

253–256° C.; and ethyl 4-hydroxy-6-isopropoxy-7-isobutyl-quinoline-3-carboxylate, M.P. 237–239° C.

Certain of the 2-loweralkoxy-loweralkylbenzene compounds used as starting materials for making the above-described 2-loweralkoxy-5-nitro-alkylbenzenes are known in the literature. Those which are not specifically described may be prepared by methods similar to those reported for analogous compounds, or by the methods described in detail below.

Where a 2-loweralkylphenol is known, the 2-loweralkoxy-loweralkylbenzene may be prepared by alkylation of the phenol with an alkylbromide, as illustrated hereinbelow with respect to making 2-isopropoxy-n-propylbenzene:

41 g. of 2-n-propylphenol, 200 ml. of dimethylformamide, and 16.2 g. of sodium methoxide are placed in a flask equipped with a stirrer and heated on a steam bath. The solution is stirred at 47° C. while 30 ml. of isopropyl bromide is added. The temperature rises to about 60° C. and a fine white precipitate separates. When the temperature begins to drop an additional 10 ml. of isopropyl bromide is added and the mixture heated on the steam bath for three hours. The mixture is then poured into 800 ml. of water and extracted three times with 200 ml. portions of ethyl ether. The combined ether extracts are washed with water, with 10% sodium hydroxide and finally again with water. The ethereal solution is dried over sodium sulfate and the ether evaporated. The residue is distilled in vacuo to give 2-isopropoxy-n-propylbenzene, B.P. 62–63° C./2 mm.

Alternatively, the desired starting materials may be prepared from phenol by reaction thereof with an alkenyl chloride, Claisen rearrangement of the resulting alkenyloxy benzene to 2-loweralkenyl phenol, further alkenylation of this latter substance with loweralkenyl halide, and finally reduction of the lower alkenyl radicals to loweralkyl radicals. This process is illustrated below for making 2-isobutoxy-isobutylbenzene and 2-n-propoxy-isobutylbenzene.

(A) 200 g. (2.2 m.) of methallyl chloride is added to a mixture of 188 g. (2 m.) of phenol and 108 g. (2 m.) of sodium methoxide in 400 ml. of dimethyl formamide. The mixture is heated in a pressure vessel at 100° C. for 10 hours, then cooled and diluted with water. The oily layer is separated, mixed with a petroleum ether extract of the aqueous layer, and then extracted with an equal volume of 10% aqueous sodium hydroxide. The petroleum ether solution is then washed with water and dried over anhydrous magnesium sulfate; the solvent is removed by evaporation and the residual liquid distilled to give methallyl phenyl ether, B.P. 44–49° C./1 mm.

(B) 207 g. of methallyl phenyl ether is heated under an air condenser with a thermometer suspended in the liquid. The flask is placed in a silicone liquid bath previously heated ot 245° C. The ether boils around 200–210° C., the boiling point gradually increases in the course of 2 hours until it reaches a maximum of 224° C., after which it begins to drop slowly. At this point the reaction mixture is cooled to room temperature and extracted with 600 ml. of 10% sodium hydroxide solution in three equal portions. The combined alkaline solutions are extracted with low-boiling petroleum ether to remove any unchanged methallyl phenyl ether. The aqueous solution is made acid to congo red and the resulting oil extracted with petroleum ether. The petroleum ether extracts are dried over magnesium sulfate and the solvent removed by evaporation. The residue is distilled in vacuo to give 2-methallylphenol, B.P. 67–70° C./1 mm.

(C) A solution of 81 g. (1.5 m.) of sodium methoxide in 400 ml. of anhydrous methanol and 222 g. (1.5 m.) of 2-methallylphenol is placed in a pressure vessel and 144 g. (1.6 m.) of methallyl chloride is added slowly to it. The mixture is heated for 16 hours at 70° C., cooled and diluted with an equal volume of water. The oily layer which separates is extracted with an equal volume of ether. The ether extract is washed with 10% sodium hydroxide to remove unreacted phenol, then washed with water and dried over magnesium sulfate. The ether is removed under reduced pressure to yield a residue of crude 2-methyllyl-oxy-methallylbenzene. This product is then dissolved in 700 ml. of methanol and hydrogenated over 6 g. of platinum oxide at room temperature at 40 lbs./sq. in. pressure. The hydrogenation is completed in 35 minutes. The solution is filtered, the filtrate evaporated to remove solvent, and the residual oil distilled at 93–94° C./1 mm. to give 2-isobutoxy-isobutylbenzene.

(D) 34 g. (0.23 m.) of 2-methylylphenol, 28 g. (0.23 m.) of allylbromide, 32 g. (0.23 m.) of potassium carbonate, and 200 ml. of acetone are placed in a 500 ml., three-necked flask fitted with a mechanical stirrer, thermometer, and water condenser. This mixture is refluxed for eight hours. Water is then added to dissolve the inorganic salts and the oil which separates is extracted with 3× 50 ml. of ether. The ether extracts are combined and washed with 10% potassium hydroxide solution. The ether solvent is removed by evaporation and the residual liquid distilled to give 2-allyloxy-methallyl benzene, B.P. 77–85° C./1 mm.

(E) 23.3 g. (0.12 m.) of 2-allyloxy-methallylbenzene is hydrogenated in 150 ml. of methanol using 1 g. of 5% palladium on charcoal using the conditions of paragraph C above. The catalyst is then removed by filtration and the solvent removed by concentration in vacuo to yield 21.4 g. of 2-n-propoxy-isobutylbenzene.

Any departure from the above description which conforms to the present invention is intended to be included within the scope of the claims.

What is claimed is:

1. A compound of the formula:

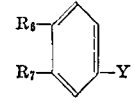

where Y represents —NO₂, —NH₂ or

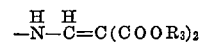

$R_3$ represents loweralkyl; $R_6$ represents loweralkoxy; and $R_7$ represents loweralkyl.

2. A compound of claim 1 wherein Y is

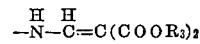

$R_3$ is methyl or ethyl; $R_6$ is loweralkoxy and $R_7$ is loweralkyl, and the number of carbon atoms in $R_6$ and $R_7$ taken together is seven or eight.

3. A compound of claim 1 wherein $R_3$ is methyl or ethyl; $R_6$ is isobutoxy or n-propoxy; and $R_7$ is isobutyl.

References Cited

UNITED STATES PATENTS 3,449,403   6/1969   Patchett et al. _____ 260—471

LORRAINE A. WEINBERGER, Primary Examiner

L. A. THAXTON, Assistant Examiner

U.S. Cl. X.R.

260—287, 575, 612